G. DRYDEN.
Boring-Machine.
No. 159,164. Patented Jan. 26, 1875.
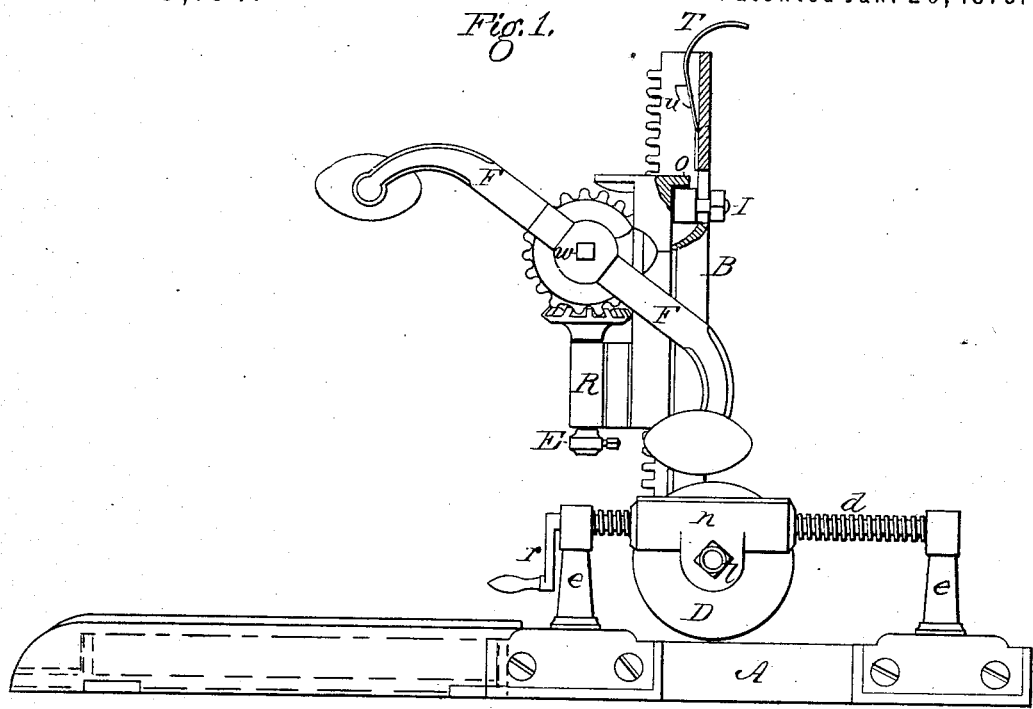
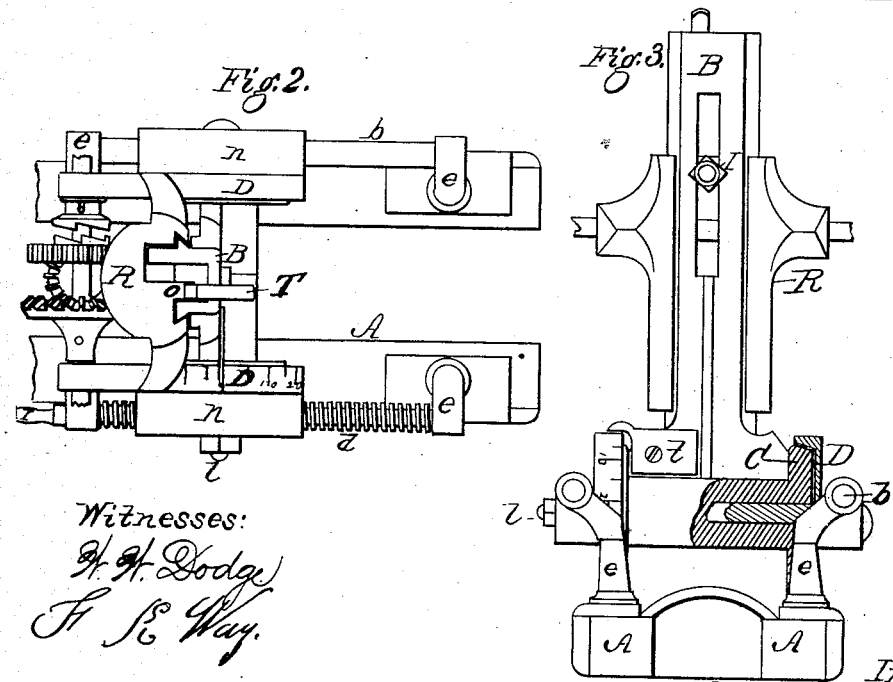
Witnesses:
H. H. Dodge
F. S. Way
Inventor:
Geo. Dryden
by Dodge & Son
Attys.

UNITED STATES PATENT OFFICE.

GEORGE DRYDEN, OF WORCESTER, MASSACHUSETTS.

IMPROVEMENT IN BORING-MACHINES.

Specification forming part of Letters Patent No. 159,164, dated January 26, 1875; application filed May 31, 1872.

*To all whom it may concern:*

Be it known that I, GEORGE DRYDEN, of the city and county of Worcester, State of Massachusetts, have invented certain Improvements in Boring-Machines, of which the following is a specification:

My invention consists of certain improvements in boring-machines, whereby the auger or boring-tool can be more readily adjusted and held at different angles, and whereby also it can be more perfectly adjusted to and fro along the timber, as hereinafter more fully explained.

Figure 1 is a side elevation; Fig. 2, a top plan view; and Fig. 3 a rear elevation of the apparatus complete.

In the drawings, A represents the base or bed piece, upon which the apparatus is mounted. The upright or standard B, on which the sliding frame that carries the operating mechanism moves up and down by a rack and pinion, in the usual manner, is widened laterally at its lower end, as shown in Fig. 3, and terminates on each side in a disk, C, which is made slightly conical, as shown in Fig. 3, where a portion is broken away to show it. These two conical disks thus form journals or bearings on which the upright B, with its attachments, is mounted. To form bearings for these journals C, I provide two concave disks, D, the interior or concave surfaces of which are made conical, to correspond with the conical journals D. A rod, $l$, passing from side to side through the bearings D and journals C, and has a nut on its end, so that by tightening it up the conical journals can be forced into their bearings D, as tightly as may be necessary to require such a degree of friction as will hold the frame B, with the auger or bit, at any required angle.

In order to indicate the angle I attach a pointer or index, $t$, to the standard B, with its point extending out over the periphery of one of the boxes D, as shown in Fig. 3. By marking on the edge of the box D the usual graduations, the standard can be instantly adjusted at any required angle, by simply pushing its top over one way or the other by the hand, the friction of the large conical bearings being sufficient to hold it in position, though if it be desired to bore a number of holes at the same angle, it may be secured in position by tightening up the nut on the bolt $l$.

In order to traverse the bit or auger back and forth to bore a series of holes, as is necessary in making a mortise, I form on the outer faces of the boxes D longitudinal sleeves $n$, as shown in Figs. 1 and 2, and these I mount on two horizontal rods, $b$ and $d$, which latter are supported at their ends by uprights $e$, which are firmly secured to the base A, as shown in Figs. 1 and 3. One of these rods, $d$, has a screw-thread cut on it, to fit in a corresponding screw cut in its sleeve $n$, and is mounted loosely in its supports $e$, and is provided with a crank, $r$, by which it can be turned, and thus move the standard B, with its bearings, back and forth on its base A.

The standard B has a vertical slot in which a bolt, I, is secured, as shown in Fig. 3, the object of which is to serve as a stop to limit the depth that the bit is to bore, this being effected by a projection, $o$, Figs. 1 and 2, on the sliding frame R, which strikes the bolt I as the bit descends. By adjusting the bolt in the slot, the depth of the holes bored can be regulated at will, and all made of uniform depth.

To the standard B is secured a spring, T, which has on its face a projection, $u$, as shown in Fig. 1, upon which the projection $o$ of the sliding frame R engages when the latter is raised, and thus it is held suspended until the spring is released by the operator.

The mechanism which operates the bit-stock E, being the same as in my patent of July 7, 1868, need not be specially described. The handles F are made adjustable by fitting loosely in a socket or mortise in the shaft, and are held in place by a set-screw, $w$, by which means they can be lengthened or shortened at pleasure.

As shown in Fig. 2, the sides or edges of the standard B are planed off to a V shape, and a corresponding form of groove is cut on the inner faces of the sliding frame R, this form of joint requiring less work to make, and making equally as good if not a better fit than the square form heretofore used.

By these improvements I am enabled to make an instrument that works with accuracy, and that is capable of every adjustment required, in an expeditious and accurate manner.

Having thus described my invention, what I claim is—

1. A boring-machine having its standard B provided with the conical journals C, in combination with the conical boxes D, and bolt *l*, substantially as described.

2. The sleeves *n*, secured to the boxes D, and mounted on the rods *b d*, one of which has a screw-thread on it for the purpose of adjusting the operating mechanism of the bit back and forth, as described.

3. The standard B, provided with the adjustable stop I and spring-catch T, in combination with the sliding frame R, provided with the projection *o*, all constructed to operate as set forth.

GEORGE DRYDEN.

Witnesses:
   DANL. GREENE,
   WM. BALL.